US009021577B2

(12) United States Patent
Song et al.

(10) Patent No.: US 9,021,577 B2
(45) Date of Patent: Apr. 28, 2015

(54) ENHANCING IPSEC PERFORMANCE AND SECURITY AGAINST EAVESDROPPING

(71) Applicant: Futurewei Technologies, Inc., Plano, TX (US)

(72) Inventors: Jifei Song, San Jose, CA (US); Xiaoyong Yi, Fremont, CA (US); Xiangyang Zhang, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 104 days.

(21) Appl. No.: 13/852,736

(22) Filed: Mar. 28, 2013

(65) Prior Publication Data

US 2013/0263249 A1 Oct. 3, 2013

Related U.S. Application Data

(60) Provisional application No. 61/618,359, filed on Mar. 30, 2012.

(51) Int. Cl.
*G06F 9/00* (2006.01)
*H04L 29/06* (2006.01)

(52) U.S. Cl.
CPC ............ *H04L 63/16* (2013.01); *H04L 63/0485* (2013.01); *H04L 63/06* (2013.01); *H04L 63/18* (2013.01); *H04L 63/164* (2013.01)

(58) Field of Classification Search
CPC ............................ H04L 63/0485; H04L 63/06
USPC ............................................ 726/14; 713/151
See application file for complete search history.

(56) References Cited

U.S. PATENT DOCUMENTS

| 7,519,721 | B2 * | 4/2009 | Godwin et al. ............... 709/230 |
| 2002/0095496 | A1 * | 7/2002 | Antes et al. ................... 709/225 |
| 2002/0097724 | A1 * | 7/2002 | Halme et al. .................. 370/392 |
| 2009/0144819 | A1 * | 6/2009 | Babbar et al. .................... 726/13 |
| 2010/0088288 | A1 * | 4/2010 | Noehring et al. ............. 707/694 |
| 2010/0169446 | A1 * | 7/2010 | Linden et al. ................. 709/206 |

OTHER PUBLICATIONS

Zhang, X., "Multiple Path IP Security," Network Working Group, Internet Draft, draft-zhang-ipsecme-multi-path-ipsec-00, ipsec-00, Apr. 9, 2012, 7 pages.
Zhang, M., et al., "Improving TCP's Performance under Reordering with DSACK," International Computer Science Institute, TR-02-006, Jul. 2002, 16 pages.

(Continued)

*Primary Examiner* — Techane Gergiso
(74) *Attorney, Agent, or Firm* — Conley Rose, P.C.; Grant Rodolph; Brandt D. Howell (57) ABSTRACT

A network element (NE) comprising a memory device configured to store instructions, and a processor configured to execute the instructions by dividing a first plurality of data packets of a data flow into a first plurality of sub-flows, and causing the first plurality of sub-flows to be transmitted to a second NE via a network, wherein the first plurality of sub-flows are transmitted using a first Internet Protocol Security (IPsec) security association (SA) cluster comprising a plurality of parallel sub-SAs. The disclosure also includes a NE comprising a processor configured to create an IPsec SA cluster comprising a first plurality of sub-SAs between the NE and a second NE using an internet key exchange (IKE) or an IKEv2, wherein the first sub-SAs are unidirectional, and wherein the first sub-SAs are configured to transport a first plurality of data packets in a common direction.

23 Claims, 4 Drawing Sheets

(56) References Cited

OTHER PUBLICATIONS

Piratla, N., et al., "Reordering of Packets Due to Multipath Forwarding—An Analysis," Proceedings of 2006 IEEE International Conference of Communications (ICC '06), Jun. 11-15, 2006, pp. 829-834.
Bradner, S., "Key Words for Use in RFCs to Indicate Requirement Levels," Network Working Group, RFC 2119, Mar. 1997, 3 pages.
Kent, S., et al., "Security Architecture for the Internet Protocol," Network Working Group, RFC 4301, Dec. 2005, 102 pages.
Kent, S., "IP Authentication Header," Network Working Group, RFC 4302, Dec. 2005, 35 pages.
Kent, S., "IP Encapsulating Security Payload (ESP)," Network Working Group, RFC 4303, Dec. 2005, 42 pages.
Jayasumana, A., et al., "Improved Packet Reordering Metrics," Network Working Group, RFC 5236, Jun. 2008, 27 pages.
Kaufman, C., et al., "Internet Key Exchange Protocol Version 2 (IKEv2)," Internet Engineering Task Force, RFC 5996, Sep. 2010, 139 pages.
Foreign Communication From a Counterpart Application, PCT Application No. PCT/US2013/034415, International Search Report dated Jun. 10, 2013, 3 pages.
Foreign Communication From a Counterpart Application, PCT Application No. PCT/US2013/034415, Written Opinion dated Jun. 10, 2013, 7 pages.
Kent, S., et al., "Security Architecture for the Internet Protocol," RFC 2401, Nov. 1, 1998, XP015008158, 71 pages.

\* cited by examiner

ENHANCING IPSEC PERFORMANCE AND SECURITY AGAINST EAVESDROPPING

CROSS-REFERENCE TO RELATED APPLICATIONS

The present application claims priority to U.S. Provisional Patent Application 61/618,359, filed Mar. 30, 2012 by Xiangyang Zhang, and entitled "Multiple Path IP Layer Security," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Networked devices may be required to communicate across a variety of networks. Some devices may require that such communications remain secure. Devices that are interconnected via a secured network may rely on the security measures inherent in the secured network to provide such security for any cross-network communications. These devices may also be required to communicate across unsecured networks. For instance, a host may communicate with another host, client, network, etc. via the Internet, which may be partially, unevenly, and/or completely unsecured. A communication may only be as secure as the weakest level of security provided to the communication at any point between the sender and the receiver. In order to maintain security for communications traversing an unsecured network, a network device may employ various security protocols. For example, a source network device may negotiate a secure connection and/or communication with a destination network device as long as both network devices are configured to employ the same security protocol(s).

SUMMARY

In one embodiment, the disclosure includes a network element (NE) comprising a memory device configured to store instructions, and a processor configured to execute the instructions by dividing a first plurality of data packets of a data flow into a first plurality of sub-flows, and causing the first plurality of sub-flows to be transmitted to a second NE via a network, wherein the first plurality of sub-flows are transmitted using a first Internet Protocol Security (IPsec) security association (SA) cluster comprising a plurality of parallel sub-SAs.

In another embodiment, the disclosure includes a NE comprising a processor configured to create an IPsec SA cluster comprising a first plurality of sub-SAs between the NE and a second NE using an internet key exchange (IKE) or an IKE version 2 (IKEv2), wherein the first sub-SAs are unidirectional, and wherein the first sub-SAs are configured to transport a first plurality of data packets in a common direction.

In another embodiment, the disclosure includes a method comprising setting up multiple IPsec SA sub-tunnels, and clustering the SA sub-tunnels together to form an SA cluster.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

IPsec is a security protocol suite that comprises security protocols for securing internet protocol (IP) communications across various networks, as discussed in Internet Engineering Task Force (IETF) document request for comment (RFC) 4301, which is incorporated by reference. IPsec may secure communications in the IP layer (e.g. layer 3 and/or network layer of the Open Systems Interconnection (OSI) model). IPsec may be an end-to-end security scheme that may protect data flows (e.g. communications) between security gateways. IPsec may employ a unidirectional SA pair to protect a data flow comprising data packets. For example, a local security gateway may employ a first SA for protecting communications transmitted to a remote security gateway and a second SA for protecting communications received from a remote security gateway. IPsec may also allow for an SA bundle, which may comprise an SA nested within an SA (e.g. a tunnel within a tunnel). IPsec may be limited to employing SA pairs and/or SA bundle pairs. IPsec may transmit packets across an SA in a sequential manner. Also, each SA may be assigned a unique security parameter index (SPI). As such, an eavesdropping node may receive all packets traversing a tunnel protected by an SA by monitoring a single network node and may correlate the packets using the SPI. In the event that the eavesdropping node defeats the SA security measures, the eavesdropping node may have complete access to the entire data flow.

Disclosed herein is a method and/or system with enhanced protection for data traffic transmitted across unsecure networks. IPsec data protection may be increased by splitting a data flow into a plurality of sub-flows and transmitting the sub-flows in parallel (e.g. via sub-tunnels and/or transport communications.) A sub-SA may be set up independently for each sub-flow. The sub-SAs may be combined to form an SA cluster. Each sub-SA may comprise a unique SPI. The sub-SAs of an SA cluster may or may not employ different network paths between a local security gateway and a remote security gateway. As such, an eavesdropping node may not have access to all sub-flows by monitoring a single node along a network path and may not be aware of the existence, number, or routes of the other network paths. As each sub-SA may comprise a unique SPI, an eavesdropping node obtaining packets from multiple sub-flows may also be unable to correlate the data packets to determine that they are related to the same flow. Also, parallel transmission of sub-flows may allow for increased transmission efficiency over serial transmission. SA clusters may be further described in IETF document draft-zhang-ipsecme-multi-path-ipsec-02, which is incorporated by reference.

The method and/or system may enhance security service by spreading the data traffic onto multiple paths. For example, such spreading may increase the difficulty for an attacker to accomplish intercepting all the packets as different routes may be used. Even when the same route is used, the attacker/eavesdropper may have difficulty determining which set of SAs are part of a particular clustered SA, which may increase the difficulty in decrypting the intercepted packets. Also, the selection of multiple paths may provide increased reliability (e.g. in case of link failure.) The use of multiple SAs may also provide additional options for optimized performance and optimal network control. These techniques may enhance the security service provided by IPsec. An SA cluster may provide the option of performing different cryptographic transformations on the different packets. In addition, an SA cluster may also provide the option of transmitting packets along the different paths.

Figure 1:
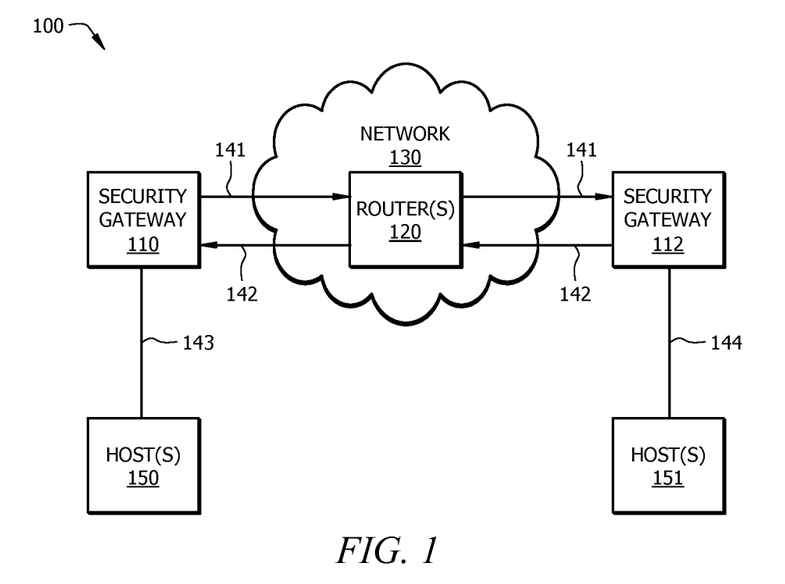
FIG. 1 is a schematic diagram of an embodiment of an IPsec security architecture.

FIG. 1 is a schematic diagram of an embodiment of an IPsec security architecture 100. The IPsec security architecture 100 may comprise hosts 150 and hosts 151, which may communicate via security gateways 110 and 112 across routers 120 positioned in an unsecured network 130. Hosts 150 and 151 may be connected to security gateways 110 and 112 via secured connections 143 and 144, respectively. Hosts 150 and 151 may wish to communicate across unsecured network 130. Security gateway 110 may setup a unidirectional SA 141 for transmissions to security gateway 112, for example by using IKE and/or IKEv2. Likewise, security gateway 112 may setup a unidirectional SA 142 for transmissions to security gateway 110, which may result in an SA pair. Host 150 may transmit data to host 151 by communicating with security gateway 110 via secured connections 143, which may transmit communications to security gateway 112 across unsecured network 130 via routers 120 using SA 141. Such communications may then be routed to host 151 via secured connection 144, resulting in end-to-end security for the transmitted communication. Host 151 may transmit data packets to host 152 in substantially the same manner, but may employ SA 142 in place of SA 141.

A host, such as hosts 150 and 151, may be any device that communicates with another host via a network. For example, a host 150 and/or 151 may comprise a server, a client terminal, or combinations thereof. Hosts 150 and 151 may be configured to communicate data for purposes of sharing resources, responding to service requests, application hosting, etc. As an example, host 150 may comprise a client terminal, host 151 may comprise a server, and host 151 may host an application and respond to application requests from host 150. As another example, hosts 150 and 151 may each comprise resources such as virtual machines (VMs), storage space, processing resources, etc., and may dynamically relocate data, applications, etc. over a network connection.

A security gateway, such as security gateways 110 and 112, may be any NE positioned at the edge of a secured network. A secured network may comprise secured connections such as secured connections 143 and 144. The security gateways 110 and 112 may provide security for any devices positioned inside and/or communications traversing the secured network. The security gateways 110 and 112 may prevent unauthorized access to the secured network (e.g. a firewall) and implement security protocols for communications leaving the secured network. For example, if hosts 150 and 151 are each positioned in a data center, security gateways 110 and 112 may be positioned at the edge of the data center network such that all traffic leaving the secured network passes through the gateways 110 and/or 112. Security gateways 110 and 112 may receive data from hosts 150 and 151, respectively, and initiate a communication session by creating IPsec SAs 141 and 142 across unsecured network 130 (e.g. the Internet). Security gateways 110 and 112 may exchange security keys, for example by using IKE and/or IKEv2, for the purpose of creating such SAs.

IPsec SAs, such as SAs 141 and 142, may operate in transport mode or tunnel mode. In transport mode a payload of a data packet (e.g. the actual data being transmitted) may be encrypted while a header of the data packet comprising data packet routing information may not be encrypted. In tunnel mode, the entire data packet may be encrypted. SAs may also comprise data and/or algorithms to support authentication header (AH) and/or encapsulating security payload (ESP) operations. AH may provide connectionless integrity and data origin authentication for data flows. ESP may provide data packet confidentiality (e.g. encapsulation), data origin authentication, connectionless integrity, anti-replay service, and flow confidentiality. SAs 141 and 142 may each be unidirectional. As such, a pair of SAs 141 and 142 may be required to communicate data packets between security gateways 110 and 112. In an embodiment, SAs 141 and 142 may each comprise an SA bundle. An SA bundle may comprise two nested SAs (e.g. a tunnel within a tunnel). For example, an SA bundle may comprise an AH SA inside a ESP SA. IPsec security architecture 100 may be limited to providing a single SA pair and/or a single SA pair bundle (e.g. SA 141 and SA 142) for each secured communication between security gateways 110 and 112. Each SA may comprise a separate SPI which may be used as an index in a SA database (SAD) and may, in combination with SA destination address, be used to uniquely identify the SA and determine the encryption keys and protocols associated with the SA.

Routers 120 may be any NE or group of NEs positioned in unsecured network 130. Routers may receive data packets from security gateway 110 and forward the data packets to security gateway 112 and vice versa. Routers 120 may route packets using OSI layer 2, layer 2.5, and/or layer 3 technologies. Routers 120 may make routing decisions based on headers of the data packets. If the data packets are encapsulated (e.g. ESP), the routers 120 may make routing decisions based on the headers of the encapsulated packets without being aware of the data stored in the data packet header and/or payload. The routers 120 may provide end-to-end connectivity between security gateway 110 and security gateway 112. The routers 120 may make up a single network path for SA 141 and a single network path for SA 142. The network path for SA 141 may or may not be the same path as the network path for SA 142.

The IPsec protocols suite specifies an example of a base architecture 100 for IPsec compliant systems. The IPsec protocol suite describes how a set of security services is provided for traffic, for example in the IP layer, in both the IP version four (IPv4) and IP version six (IPv6) environments. As discussed herein, the IPsec protocol suite defines SAs as concepts of IPsec. The SAs (e.g. SAs 141 and 142) may define a simplex connection that may afford security services to the traffic carried by the connection. Security services may be afforded to an SA by the use of AH, or ESP, but may not be provided by both in a single SA. AH and ESP may be further described in IETF documents RFC 4302 and RFC 4303, which are incorporated herein by reference. If both AH and ESP protection are to be applied to a traffic stream, then two SAs may be created and coordinated to effect protection through iterated application of the security protocols (e.g. nested SAs). Since one SA may be used to carry uni-cast traffic, a pair of SAs (e.g. SAs 141 and 142) may be established in point-to-point communication. The two SAs 141 and 142 may create one uni-cast IPsec tunnel between the two security gateways 110 and 112. In order to differentiate between different SAs, the SPI, which may comprise a 32-bit value, may be used by a receiver to identify the SA to which an incoming data packet should be bound. The SPI assignment may be completed at the creator of the SA, which may be the receiving side. At the sending side, additional destination IP address information may be used to resolve any SPI conflicts. In this way, the sending side may select the correct SA under which IP packet will be processed. In another embodiment, each security gateway 110 and 112 may assign a local SPI and each maintain knowledge of the counterpart's SPI. When sending a packet, each party (e.g. gateway 110 or 112, respectively) may employ the SPI of the other party (e.g. gateway 112 or 110, respectively) in the data packet header.

It should be noted that although FIG. 1 depicts only SAs positioned between security gateways 110 and 112 (e.g. SAs 141 and 142), a host, such as hosts 150 and/or 151 may communicate directly with a gateway, such as gateway 110 and/or 112 via an SA in some embodiments. For instance, a client terminal acting as a host may not be positioned on a secure network. In that case, the client terminal may communicate directly with the security gateway across the unsecured network 130 using SAs.

Figure 2:
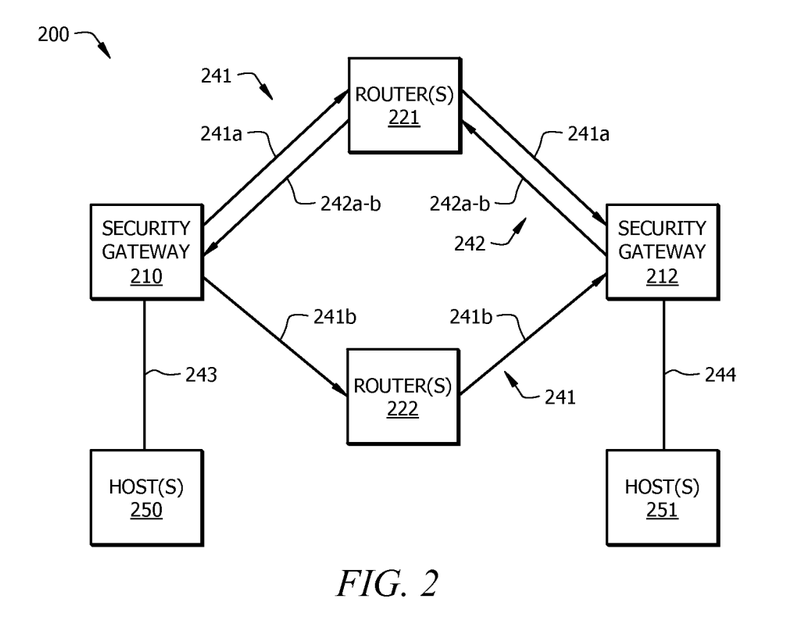
FIG. 2 is a schematic diagram of another embodiment of an IPsec security architecture.

FIG. 2 is a schematic diagram of another embodiment of an IPsec security architecture 200. Architecture 200 may comprise hosts 250 and 251, secured connections 243 and 244, security gateways 210 and 212, and routers 221 and 222, which may be substantially similar to hosts 140 and 141, secured connections 143 and 144, security gateways 110 and 112, and routers 120, respectively. The security gateways 210 and 212 may communicate via SA cluster 241 and SA cluster 242.

SA clusters 241 and 242 may each comprise a plurality of parallel sub-SAs. Parallel sub-SAs may be plurality of unidirectional sub-SAs with the same source node (e.g. security gateway 210), same destination node (e.g. security gateway 212), and that may each transport a portion of the same data flow. For example, SA cluster 241 may comprise parallel sub-SAs 241a and 241b, and SA cluster 242 may comprise parallel sub-SAs 242a and 242b. An SA cluster may be different from an SA bundle in that sub-SAs may not be nested. However, a sub-SA may comprise an SA bundle in some embodiments. While only two sub-SAs are depicted per SA cluster, SA clusters 241 and 242 may comprise as many sub-SAs as are desired for a specified communication. Sub-SAs 241a and 241b may each be similar to SA 141, and sub-SAs 242a and 242b may be similar to SA 242, respectively. However, each sub-SA may only transport and/or encapsulate a portion of a data flow. For example, security gateway 210 may wish to transmit a data flow comprising a plurality of data packets to security gateway 212 via SA cluster 241. Security gateway 210 may alternate packets between sub-SAs 241a and 241b, send more packets on sub-SA 241a than on sub-SA 241b, partition the flow into discrete data packet blocks and alternate blocks between sub-SAs 241a-241b, etc. Sub-SAs may each comprise a different SPI, and therefore an SA cluster 241 and/or 242 may comprise a plurality of SPIs. Sub-SAs of an SA cluster may employ the same route or a different route between security gateways. For example, SA cluster 241 may comprise sub-SA 241a which may employ a route via routers 221 and sub-SA 241b which employs a route via routers 222, respectively. As another example, SA cluster 242 may comprise sub-SAs 242a and 242b, which may both employ a route via routers 221.

Architecture 200 may allow data flows to be split and routed in ways that may be unpredictable by an eavesdropping node. As each SA cluster may comprise an unknown number of sub-SAs, the eavesdropping node may be unaware of the exact number of data packets that are related to a particular data flow. Further, as each SA cluster may comprise a plurality of SPIs, an eavesdropping node may be unable to correlate any data packets obtained, and may be unable to determine that the data packets are related to the same data flow. In addition, as some sub-SAs may traverse a different network route than other sub-SAs, the eavesdropping node may be unable to obtain all of the data packets of the flow by monitoring a single network node and may be unable to determine which other network nodes should be monitored to obtain the remaining data packets. As such, the use of SA clusters 241 and/or 242 may add significant uncertainty to the eavesdropping and/or hacking process, and may thus strengthen security over an unsecured network. Also, the ability to transmit data packets in parallel sub-SAs may allow for transmission optimization. For example, if routers 221 become congested, outgoing data packets may be shifted from sub-SA 241a to 241b without terminating the communication session. Further, parallel transmission of the data flow packets may allow for increased processing efficiency with parallel processors when compared to the serial processing of the data flow packets that may be required by architecture 100. For example, SA lookup, sequence number generation, and/or anti-replay checks may be performed in parallel when data flow packets are transmitted in parallel.

Architecture 200 may employ Abstract Syntax Notation one (ASN.1) to implement the creation and use of SA clusters. The following ASN.1 definition may be to create an SA cluster (e.g. SA cluster 241 and/or 242), based on the number of sub-SAs (e.g. sub-SAs 241a and 241b or 242a, and 242b, respectively), and also to select the appropriate sub-SA for sub-flow transmission:

```
Processing ::=SEQUENCE {
extSeqNum    BOOLEAN,    -- TRUE 64 bit counter, FALSE 32 bit
seqOverflow  BOOLEAN,    -- TRUE rekey, FALSE terminate & audit
fragCheck    BOOLEAN,    -- TRUE stateful fragment checking,
                         -- FALSE no stateful fragment checking
lifetime     SALifetime,
spi          ManualSPI,
algorithms   ProcessingAlgs,
tunnel       TunnelOptions OPTIONAL ,  -- if absent, use transport mode
saCount      INTEGER OPTIONAL,         -- if absent, use 1
selectSA     SASelAlgoType OPTIONAL    -- ignored if saCount is 1,
                                       -- if absent, use round-robin
```

```
}
SASelAlgoType ::=INTEGER {
round-robin  (0),
random       (1),
others       (2)
}
```

In the ASN.1 definition discussed above, extSeqNum, seqOverflow, and fragCheck attributes may be Boolean values (e.g. may contain the value of true or false), and may be set to indicate whether the entity creating the SA cluster (e.g. the sub-flow sender) should set a sixty four bit or a thirty two bit counter, rekey or terminate the cluster in case of a sequence number overflow, and statefully check or not statefully check for flow fragmentation, respectively. The Lifetime attribute may indicate the lifetime of the SA cluster and/or of a particular sub-SA, where lifetime may be the amount of time an SA cluster and/or sub-SA remains active without receiving and/or transmitting data. The SA cluster may be set to never time out. The SPI attribute may be employed by an administrator to manually set an SPI value and may be ignored if an SPI is automatically generated. The algorithms attribute may indicate other processing algorithms used to create and/or employ the SA cluster and/or sub-SAs. The tunnel attribute may be used to indicate whether the SA cluster and/or the sub-SAs use tunnel and/or transport mode and any options associated with tunnel mode. The saCount attribute may be a variable and may be set to an integer or other value to indicate the number of sub-SAs to be created for a SA cluster. The selectSA attribute may be a variable and may be set to an integer or other value to correspond with SASelAlgoType. selectSA may be used by the sender to select a sub-SA for transmission of a particular sub-flow. SASelAlgoType may be a variable and may be set to an integer or other value to indicate a particular selection algorithm. For example, SASelAlgoType may be set to a value of zero to indicate a round-robin selection algorithm, a value of one to indicate a random selection algorithm, other values to indicate other selection algorithms (e.g. user defined, apportion based on SA path latency, apportion based on SA path guaranteed Quality of Service, etc.) Round robin may be a selection algorithm that assigns equal portions of a data flow to each sub-SA.

Data confidentiality may be the protection of transmitted data from passive attacks, such as eavesdropping. In IPsec implementation (e.g. architecture 100), all IP datagrams may be transmitted inside one IPsec tunnel, which may be afforded protection by one SA. In order to enhance the confidential security service, a set of SAs (e.g. sub-SAs 241a, 241b, 242a, and/or 242b) may be employed to protect the traffic. Multiple tunnels may be setup between two entities and then clustered together to form one clustered tunnel (e.g. SA cluster 241 and/or 242.) One IP packet may still be protected by a single SA. The sending entity may split the traffic among all these sub-SAs. The receiving entity may multiplex the traffic from the plurality of IPsec tunnels. The tunnels clustered together may be termed sub-tunnels. The SAs for the sub-tunnels may be termed sub-SAs. The IP traffic, which may be protected inside one clustered tunnel, may be split among all the sub-tunnels. The term SA cluster, may be used to describe the combination of SAs through which the traffic must be processed to satisfy a security policy. As multiple sub-tunnels are set up for the same flow of traffic between two secure entities, the physical paths may be different. The processing order of these clustered SAs may be a local matter as all these SAs may or may not be not nested SAs.

It should be noted that SA clustering may be performed by the sender and that the receiving entity may be unaware of the existence of the SA cluster at the IP layer. For example, traffic multiplexing may be performed by an upper layer process and not directly performed by an IPsec process as the receiver may have no mechanism to correlate SA cluster traffic across multiple sub-SAs at the IP layer. However, upper layer processes may employ other methods to collect multiplex the traffic (e.g. by correlating sequence numbers related to upper layer processes, etc.)

If a sub-SA is negotiated through IKE negotiation, the sub-SA may comprise its own soft and hard lifetime. However, there may not be a lifetime for SA cluster. Architecture 200 may not change the maintenance of each sub-SA. If one sub-SA becomes invalid (e.g. timeout), such sub-SA may not be used for further packet processing. If a SA cluster ceases to hold any valid sub-SAs, the SA cluster may become invalid.

Figure 3:
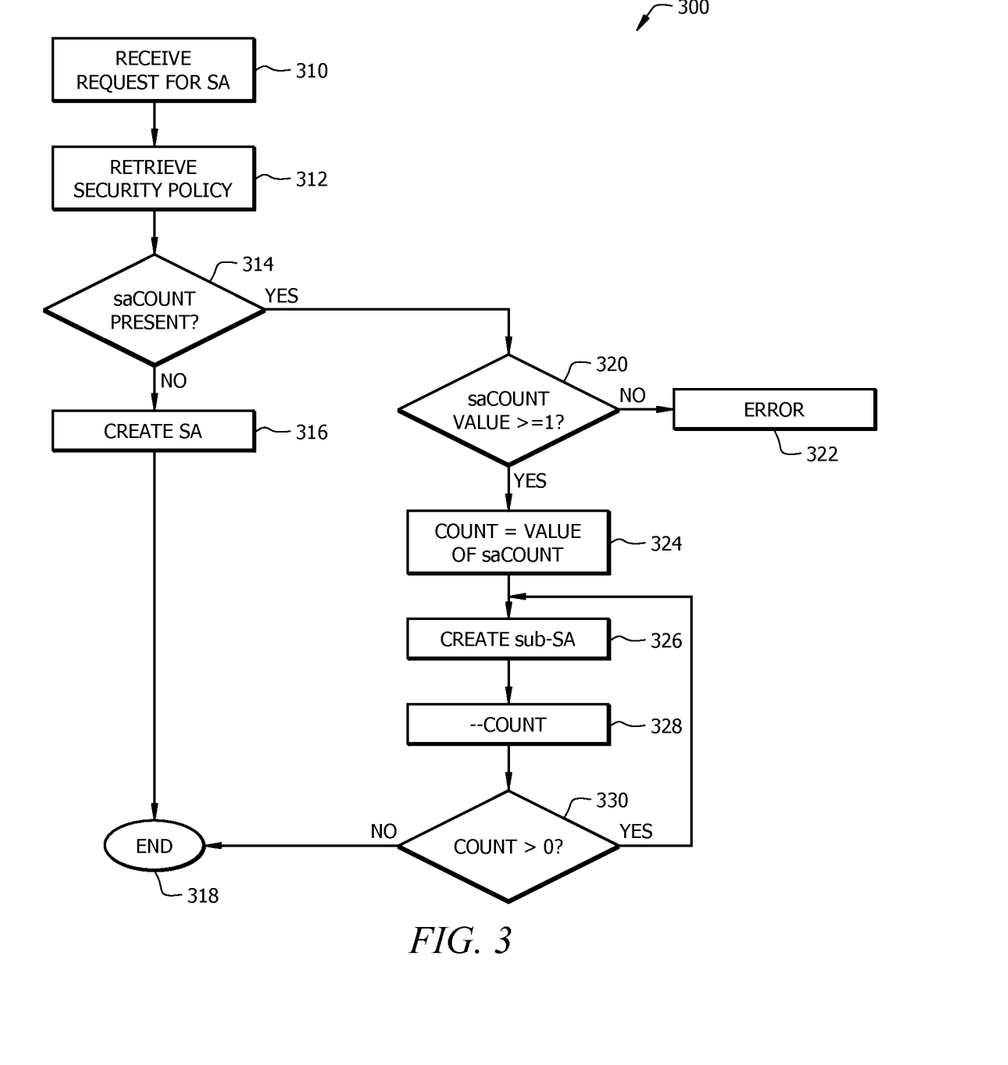
FIG. 3 is a flowchart of an embodiment of a method of creating an SA cluster.

FIG. 3 is a flow chart of an embodiment of a method 300 of creating an SA cluster. In method 300 a NE, such as security gateway 210 and/or 212, may receive a request (e.g. from a host 240) to establish an SA with another NE, such as security gateway 212 at step 310. At step 312, the method 300 may retrieve a security policy for the SA. The security policy may be stored in a security policy database (SPD), which may be located on the NE and/or may be accessed from another NE such as a management NE. The security policy may be used to determine the processing parameters and/or crypto key materials that will be associated with the SA. At step 314, the method 300 may check the security policy to determine in an saCount variable is present. The method 300 may proceed to step 316 if the saCount variable is not present and proceed to step 320 if the saCount is present.

At step 316, the saCount variable is not present, which may mean that a single SA (e.g. SA 141) has been specified by the security policy. As such, the method 300 may create the SA, for example by using IKE and/or IKEv2, proceed to step 318 and end.

At step 320, the saCount variable may be present, which may mean that a SA cluster is specified by the security policy. The value of the saCount variable may indicate the number of sub-SAs in the SA cluster. If the value of the saCount variable is not greater than or equal to one, the method 300 may proceed to step 322 and return an error as a cluster may require at least one sub-SA. If the value of saCount is greater than or equal to one, the method 300 may proceed to step 324. At step 324, the method of may create a count variable and set the value of the count variable equal to the value of the saCount variable. At step 326, the method 300 may create a sub-SA (e.g. by using IKE and/or IKEv2). At step 328, the value of the count variable may be decremented by one. At step 330, the method 300 may determine if the value of the count variable is greater than zero. If the value of the count variable remains greater than zero, the method 300 may return to step 326 and create additional SAs as dictated by the value of the count variable. One the value of the count variable reaches zero at step 330, the method 300 may proceed to step 318 and end. As such, the sub-SAs may be created based on the security policy and added to the SA cluster.

As discussed above, an SA cluster setup may comprise multiple sub-SA setups. The sub-tunnels may be setup independently. After setup, the sub-tunnels can be added to the cluster one by one. The exact manner of adding the sub-SAs into the SA cluster may be a local matter. All the collaborative sub-tunnels may comprise different SPI values. There may be no limitation on how many sub-tunnels may be used for one clustered tunnel. Both the sending entity and the receiving entity may agree on the SA cluster specifications before any IPsec traffic is transmitted through any of the sub-tunnels. New sub-SAs may be setup and joined to the SA cluster even after the traffic begins to flow inside the clustered tunnel. Even though the sub-tunnels may be independent, they may share only one sequence number source. Each IPsec packet carried inside the clustered tunnel may comprise a unique sequence number.

All the sub-tunnels may be set up independently. The traffic through the different sub-tunnels may employ the same route. The traffic may also employ different routes based on the routing policy, for example by using equal cost multipath routing. In case that an SA cluster comprises only one sub-SA, the SA cluster may be fully interoperable with IPsec implementation under architecture 100 if a device designed for architecture 100 does not support SA clusters.

Figure 4:
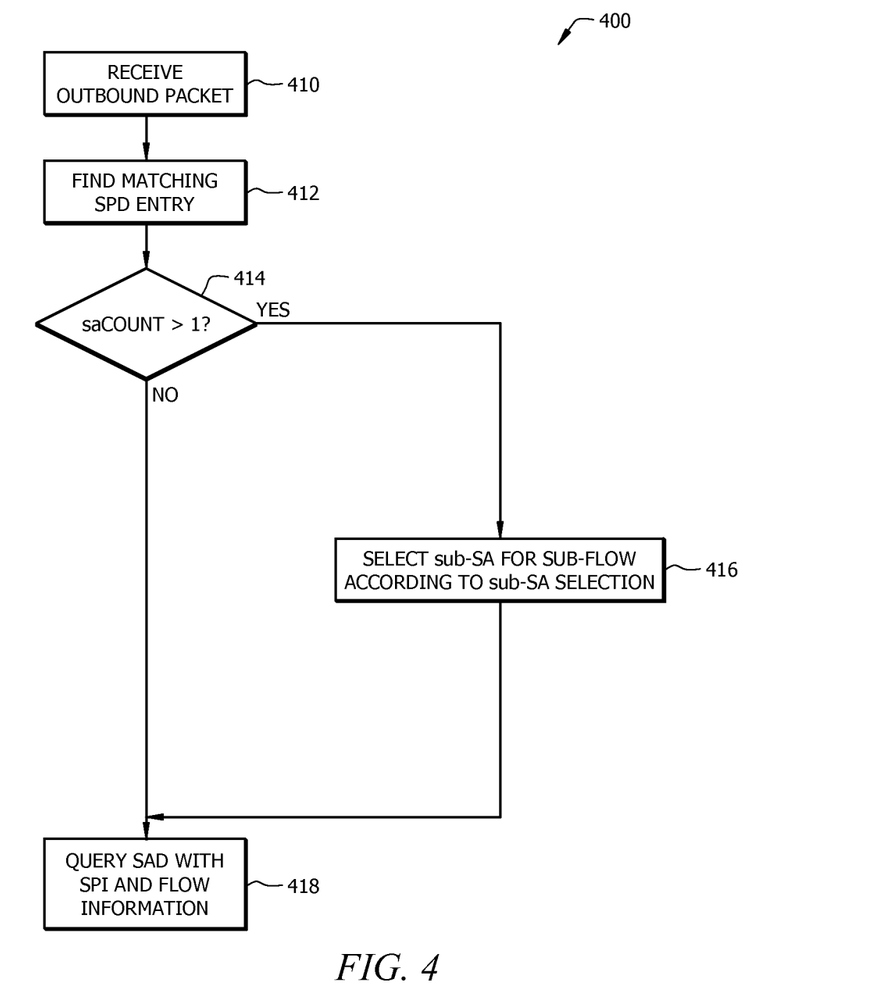
FIG. 4 is a flowchart of an embodiment of a method of selecting a sub-SA for a data sub-flow.

FIG. 4 is a flow chart of an embodiment of a method 400 of selecting a sub-SA for a data sub-flow. At step 410, an outbound packet may be received, for example by a security gateway 210 and/or 212. At step 412, the method 400 may query the SPD to find the SPD entry that matches the flow to which the packet from step 410 belongs. At step 414, the method 400 may determine if the saCount value stored in the SPD entry is greater than one. The method may proceed to step 418 if the saCount value is not greater than one and proceed to step 416 if the saCount value is greater than one. At step 418, the method 400 may query an SA database (SAD) using the SPI of the SA and the flow information to find data to perform SA encapsulation and/or transport. If the count value is one or less, there may be only one SA and SA selection may not be needed. If the count value is greater than one, at step 416 the method 400 may select a sub-SA for the sub-flow according to a sub-SA selection algorithm (e.g. selectSA and/or SASelAlgoType). Once the sub-SA is selected, the method may proceed to step 418 and query the SAD using the SPI of the selected sub-SA. In this manner, data packets of a flow may be distributed between sub-SAs by using the selection algorithm. The selection algorithm may alternate packets between sub-SAs for both data traffic efficiency and security reasons as discussed hereinabove.

As discussed above, the sending entity may split and/or alternate the IPsec traffic through a plurality of sub-tunnels. When the SA cluster is selected for the traffic processing based on security policy configuration, one sub-SA may be chosen for outbound IPsec processing for a specified packet. Local implementation may determine which SA should be applied to the specified IP packet. Except that the sequence numbering may be shared among all sub-SAs, other processing procedures associated with architecture 100 may not be altered. A local implementation at the sending entity may choose any method to obtain the sequence number for a packet, which may be independent of sub-SA selection. In an alternate embodiment, each sub-SA may generate its own sequence numbering, which may not require sequence number sharing between sub_SAs.

Figure 5:
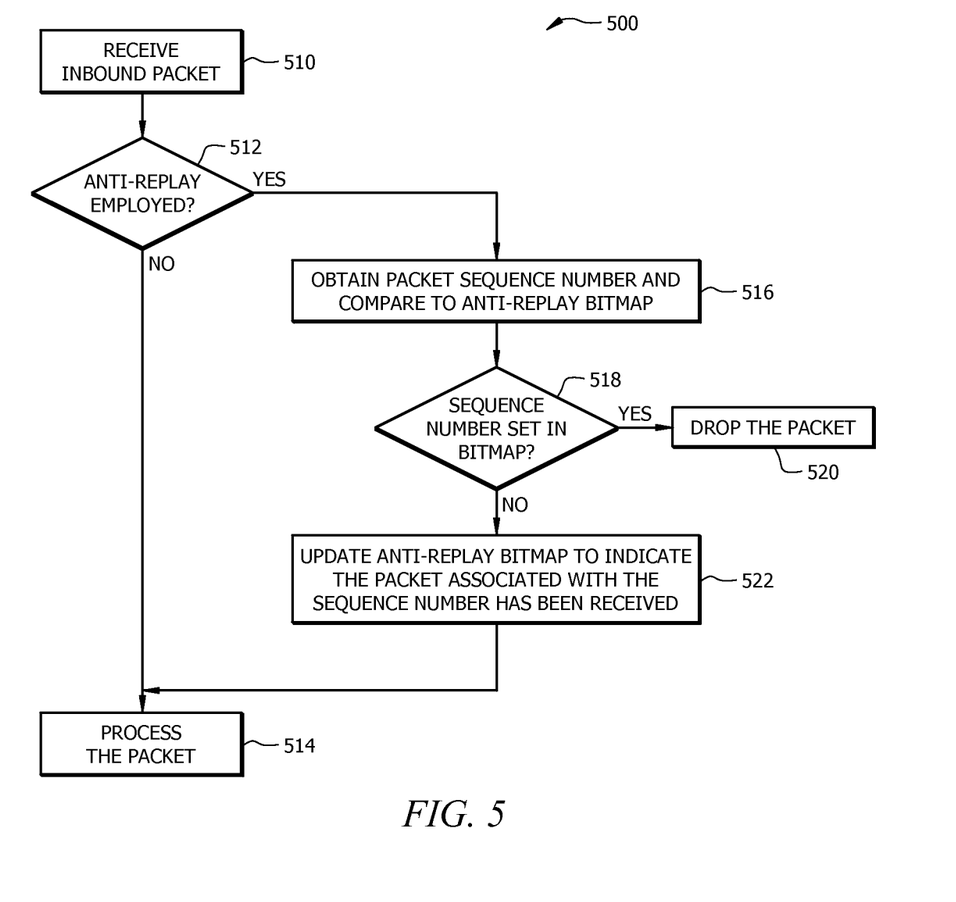
FIG. 5 is a flowchart of an embodiment of a method of receiving data via an SA cluster.

FIG. 5 is a flow chart of an embodiment of a method 500 of receiving data via an SA cluster. Anti-replay may be a function of IPsec, and may be employed to prevent a receiving NE from processing the same packet multiple times. If a single SA is employed, packets may be received in sequential order, which may allow the receiving NE to discard any new packet received with a sequence number lower than the sequence number of the last packet received. When an SA cluster is employed, packets may be transmitted in parallel. As such, data packets may be received out of order if sequence number sharing is employed. Method 500 may be employed to implement an anti-replay function when employing an SA cluster via the use of an anti-replay bitmap.

At step 510, an inbound packet may be received, for example by a security gateway 210 and/or 212. At step 512, the method may determine if anti-replay is employed by the SA, for example by querying the SPD using the SPI. If anti-replay is not employed for the SA, the method 500 may proceed to step 514 and process the packet. If anti-replay is employed, the method 500 may proceed to step 516. At step 516, the method 500 may obtain the data packet's sequence number and compare the sequence number to the anti-replay bitmap. For example, the anti-replay bitmap may comprise all possible sequence numbers with corresponding values (e.g. each set to a value of zero, a value of one, or combinations thereof) to indicate whether the packet corresponding to the sequence number has been received. At step 518, the method 500 may determine whether the sequence number is set in the anti-replay bitmap. If the sequence number is set (e.g. to a value of one), the method may determine that a packet with the sequence number has already been received, proceed to step 520, and drop the packet. If the sequence number is not set (e.g. to a value of one), the method may determine that a packet with the sequence number has not been received and may proceed to step 522. At step 522, the method may update the anti-replay bitmap to indicate that the packet associated with the sequence number has been received (e.g. by setting the corresponding value to a value of zero). The method 500 may then proceed to step 514 and process the packet.

As discussed above, the selection of a sub-SA on the receiver side may be a similar process to the selection of a single SA, both of which may be based on SPI and IP address information. With the exception of changes to the sequence number processing, other aspects may not be changed. The use of multiple sub-tunnels may cause out-of-order delivery of IPsec packets for the secure communication channel between two entities. As a remedy, the sequence number in the data packet IPsec header can be used if the receiving entity needs to maintain the sending order. If anti-replay is enabled, all the sub-tunnels may use one shared anti-replay bitmap at the receiving entity. The anti-replay check may be completed against the SA cluster instead of a particular sub-SA.

While the multipath solution may introduce the issue of out of order delivery, the out of order problem may also occur with a single SA. The reorder process may be completed at an aggregate node and/or an end host (e.g. host 240 and/or 241), based on the topology of a particular network, in a manner similar to TCP reorder and/or IP reassembly.

Figure 6:
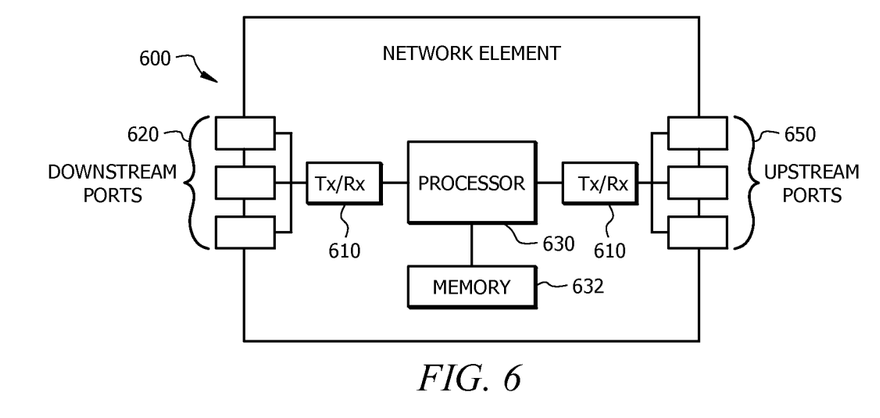
FIG. 6 is a schematic diagram of an embodiment of a NE.

FIG. 6 is a schematic diagram of an embodiment of a network element (NE) 600, which may comprise a security gateway 110, 112, 210, and/or 212, a host 140, 141, 240, and/or 241, and/or routers 120, 221, and/or 222. One skilled in the art will recognize that the term NE encompasses a broad range of devices of which NE 600 is merely an example. NE 600 is included for purposes of clarity of discussion, but is in no way meant to limit the application of the present disclosure to a particular NE embodiment or class of NE embodiments.

At least some of the features/methods described in the disclosure, for example method 300 for creating an SA cluster, method 400 for selecting a sub-SA for a sub-flow, and/or method 500 for receiving data from an SA cluster, may be implemented in whole or in part in a network apparatus or component such as an NE 600. For instance, the features/methods in the disclosure may be implemented using hardware, firmware, and/or software installed to run on hardware. The NE 600 may be any device that transports frames through a network, e.g., a switch, router, bridge, server, a client, etc. As shown in FIG. 6, the NE 600 may comprise transceivers (Tx/Rx) 610, which may be transmitters, receivers, or combinations thereof. A Tx/Rx 610 may be coupled to plurality of downstream ports 620 for transmitting and/or receiving frames from other nodes, and a Tx/Rx 610 coupled to plurality of upstream ports 650 for transmitting and/or receiving frames from other nodes. A processor 630 may be coupled to the Tx/Rxs 610 to process the frames and/or determine which nodes to send frames to. The processor 630 may comprise one or more multi-core processors and/or memory devices 632, which may function as data stores, buffers, etc. Processor 630 may be implemented as a general processor or may be part of one or more application specific integrated circuits (ASICs) and/or digital signal processors (DSPs). The downstream ports 620 and/or upstream ports 650 may contain electrical and/or optical transmitting and/or receiving components. NE 600 may or may not be a routing component that makes routing decisions.

It is understood that by programming and/or loading executable instructions onto the NE 600, at least one of the processor 630, downstream ports 620, Tx/Rxs 610, memory 632, and/or upstream ports 650 are changed, transforming the NE 600 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means ±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:
1. A network element (NE) comprising:
a memory device configured to store instructions; and
a processor configured to execute the instructions by:
dividing a first plurality of data packets of a unidirectional data flow into a first plurality of unidirectional sub-flows;

assigning each sub-flow of the data flow to a different parallel sub-security association (SA) of a first Internet Protocol Security (IPsec) security association (SA) cluster; and causing the first plurality of sub-flows to be transmitted to a second NE across a network via a plurality of IPsec tunnels, each IPsec tunnel being associated with a different sub-SA and transporting a different sub-flow of the data flow.

2. The NE of claim 1, wherein a first of the sub-SAs traverses a different network path than a second of the sub-SAs.

3. The NE of claim 1, wherein a first of the sub-SAs traverses a common network path with a second of the sub-SAs.

4. The NE of claim 1, wherein the sub-SAs are not nested.

5. The NE of claim 1, wherein the data packets of the data flow are distributed between the first plurality of sub-SAs by using a selection algorithm.

6. The NE of claim 5, wherein the selection algorithm comprises a round robin selection algorithm, a random selection algorithm, or combinations thereof.

7. The NE of claim 1, wherein each of the plurality of sub-SAs comprises a Security Parameter Index (SPI), and wherein each sub-SA SPI comprises a different value than each other sub-SA SPI.

8. The NE of claim 1, wherein the processor is further configured to receive a second plurality of sub-flows from the second NE via a second IPsec SA cluster.

9. The NE of claim 8, wherein the second plurality of sub-flows comprise a second plurality of data packets, and wherein the processor is further configured to execute the instructions by performing an anti-replay function on the second plurality of data packets by using an anti-replay bitmap.

10. The NE of claim 1, wherein the first plurality of data packets each comprise a sequence number, and wherein the sequence number is determined based on the sub-flow with which a data packet is associated and not determined based on the data flow.

11. A network element (NE) comprising:
a processor configured to:
create an Internet Protocol Security (IPsec) Security Association (SA) cluster comprising a first plurality of unidirectional sub-SAs between the NE and a second NE using an internet key exchange (IKE) or an IKE version 2 (IKEv2);
divide a plurality of data packets of a unidirectional data flow into a first plurality of unidirectional sub-flows; and
assign each sub-flow of the data flow to a different sub-SA of the first plurality of sub-SAs of the SA cluster; and
a memory coupled to the processor, the memory comprising a SA database (SAD) configured to store a Security Parameter Index (SPI) for each sub-SA of the SA cluster to correlate encryption keys with each sub-SA.

12. The NE of claim 11, wherein the processor is further configured to use the first sub-SAs to transmit a first plurality of data packets to the second NE via a network during a communication session.

13. The NE of claim 12, wherein the processor is further configured to receive a second plurality of data packets from the second NE via the network during the communication session, and wherein the second plurality of data packets are received via a second IPsec SA cluster comprising a second plurality of sub-SAs.

14. The NE of claim 13, wherein the second plurality of sub-SAs are unidirectional, wherein the second sub-SAs are configured to transport data packets in a common direction, and wherein the second sub-SAs are configured to transport data packets in an opposite direction of the first sub-SAs.

15. The NE of claim 13, wherein a lookup of the first sub-SAs in a database is performed in parallel, a sequence number of the first plurality of data packets is generated in parallel, an anti-replay check of the second plurality of data packets is performed in parallel, or combinations thereof.

16. The NE of claim 11, wherein the processor is further configured to create the SA cluster by processing an saCount attribute, and wherein a value associated with the saCount attribute indicates a quantity of first sub-SAs in the SA cluster.

17. The NE of claim 11, wherein the processor is further configured to create the SA cluster by processing a selectSA attribute, and wherein a value associated with the selectSA attribute indicates a selection algorithm for selecting a sub-SA for transmission of a sub-flow associated with the first plurality of data packets.

18. A method implemented in a first security gateway, the method comprising:
setting up multiple Internet Protocol Security (IPsec) Security Association (SA) sub-tunnels with a second security gateway;
clustering the SA sub-tunnels together to form an SA cluster;
receiving a unidirectional data flow from a first host;
dividing packets from the unidirectional data flow into a plurality of unidirectional sub-flows;
assigning each sub-flow of the data flow to a different SA sub-tunnel of the SA cluster; and
transmitting the sub-flows toward a second host via the SA sub-tunnels of the SA cluster and via the second security gateway.

19. The method of claim 18, wherein the sub-tunnels are setup independently, and wherein the sub-tunnels are added to the SA cluster one by one.

20. The method of claim 19, further comprising splitting or alternating IPsec traffic through the subtunnels.

21. The method of claim 20, wherein the SA cluster does not comprise a lifetime.

22. The method of claim 21, wherein the sub-tunnels use a shared anti-replay bitmap at a receiving entity.

23. The method of claim 21, wherein the SA sub-tunnels each use a separate anti-replay bitmap.

* * * * *

UNITED STATES PATENT AND TRADEMARK OFFICE
CERTIFICATE OF CORRECTION

PATENT NO. : 9,021,577 B2  
APPLICATION NO. : 13/852736  
DATED : April 28, 2015  
INVENTOR(S) : Song et al.

Page 1 of 1

It is certified that error appears in the above-identified patent and that said Letters Patent is hereby corrected as shown below:

On the title page item [56]

delete "Zhang, X., "Multiple Path IP Security," Network Working Group, Internet Draft, draft-zhang-ipsecme-multi-path-ipsec-00, ipsec-00, April 9, 2012, 7 pages." and insert -- Zhang, X., "Multiple Path IP Security," Network Working Group, Internet Draft, draft-zhang-ipsecme-multi-path-ipsec-00, April 9, 2012, 7 pages. --

Signed and Sealed this  
Tenth Day of November, 2015

Michelle K. Lee  
*Director of the United States Patent and Trademark Office*